United States Patent
Alt

[11] Patent Number: 5,748,219
[45] Date of Patent: May 5, 1998

[54] ELECTROTHERMAL RECORDER

[75] Inventor: Yehuda Alt, Tel Aviv, Israel

[73] Assignee: Thermopol, Inc., Chicago, Ill.

[21] Appl. No.: 353,084

[22] Filed: Dec. 9, 1994

[51] Int. Cl.[6] .............. B41J 2/315; B41J 2/32; G01D 15/10
[52] U.S. Cl. .............................................. 347/171
[58] Field of Search ...................... 346/49, 55, 56, 346/57, 102, 150.2, 150.1, 150.3, 137; 347/171, 180

[56] References Cited

U.S. PATENT DOCUMENTS

| | | | |
|---|---|---|---|
| 1,865,060 | 6/1932 | Cool | 346/137 |
| 2,659,651 | 11/1953 | Benno | 346/150.2 |
| 3,596,278 | 7/1971 | Kobayashi | 346/137 |
| 4,456,915 | 6/1984 | Crooks et. al. | 346/76 PH |
| 4,606,267 | 8/1986 | Wessel et. al. | 101/93.04 |
| 4,875,056 | 10/1989 | Ono | 347/180 |
| 5,353,051 | 10/1994 | Katayama et. al. | 347/13 |

FOREIGN PATENT DOCUMENTS

| | | |
|---|---|---|
| 0177633 A1 | 4/1986 | European Pat. Off. . |
| 177633 | 4/1986 | European Pat. Off. . |

*Primary Examiner*—Benjamin R. Fuller
*Assistant Examiner*—L. Anderson
*Attorney, Agent, or Firm*—Wallenstein & Wagner, Ltd.

[57] ABSTRACT

An electrothermal recorder comprising a thermosensitive recording surface which moves at a preselected, controlled, rate along a time axis, an electrothermal print head having an array of separately activated electrothermal printing elements engaging said thermosensitive recording surface along a recording axis generally perpendicular to said time axis and a controller which generates command signals to said printhead for selectively activating the electrothermal elements of said printhead, in accordance with an input responsive to the magnitude of a preselected parameter, such that the location of activated ones of said electrothermal elements, along the recording axis, corresponds to said input.

12 Claims, 5 Drawing Sheets

ELECTROTHERMAL RECORDER

FIELD OF THE INVENTION

The present invention relates to recording apparatus in general and, more particularly, to circular data recorders.

BACKGROUND OF THE INVENTION

There are various devices and methods for recording the time dependence of a measurable parameter. A typical recorder includes a probe, which senses the parameter and generates an electric signal responsive to the magnitude of the sensed parameter, and a print head which moves along a predefined recording axis in response to changes in the electric signal. The position of the print head along the recording axis generally corresponds to the magnitude of the sensed parameter.

To record the time dependence of the parameter, the print head is juxtaposed with a recording material, such as paper, which moves at a preselected, controlled, rate along a time axis generally perpendicular to the recording axis. A recording member, such as a pen or pencil, is mounted on the print head and engages the surface of the recording material, such that a graph of the measured parameter versus time is drawn on the recording material. Alternatively, the print head described above may be replaced with a movable pressure scriber.

The time axis defined above may be a linear axis, in which case the recorder is referred to as a linear recorder, or a circular axis, in which case the recorder is referred to as a circular recorder. The recorded parameters may be any physical parameters which can be translated into corresponding electric signals by an appropriate probe.

SUMMARY OF THE INVENTION

The present invention seeks to provide an electrothermal data recorder. In a preferred embodiment of the present invention, the conventional moving printhead is replaced with a static, solid state, electrothermal printhead. The electrothermal printhead of the present invention includes an array of electrothermal elements engaging a movable thermal recording surface along a preselected recording axis. The recording surface moves with respect to the electrothermal head along a time axis generally perpendicular to the recording axis.

In a preferred embodiment of the invention the recorder is a circular recorder, i.e. the time axis is a circular axis. The recording surface is preferably the surface of a disk shaped card which rotates at a preselected, controlled, rate about a fixed axis, preferably at the center of the card. In this preferred embodiment, the recording axis is generally parallel to a radius of the disk-shaped card.

In a preferred embodiment of the present invention, the recorder is associated with a probe which senses the magnitude of a preselected parameter, such as temperature, and provides an output responsive to the sensed magnitude, typically an analog output. The probe output is translated, through a controller, into a form suitable for selectively activating the electrothermal elements of the printhead. The recorder preferably includes an analog to digital (A/D) converter which converts the probe output into a digital signal readable by the controller.

Based on the magnitude of the probe signal, the controller determines an address (i.e. location) along the recording axis, where an electrothermal element is to be activated. In a preferred embodiment of the invention, the location of the activated elements of the print head along the recording axis, at any given time, corresponds to the magnitude of the sensed parameter at the given time.

In accordance with a preferred embodiment of the present invention, motion of the thermosensitive recording surface is provided by a motor, preferably a step motor, controlled by a time-base circuit in the controller. The rate of motion of the recording surface is preferably adjustable.

BRIEF DESCRIPTION OF THE DRAWINGS

The present invention will be better understood from the following detailed description of a preferred embodiment of the invention, taken in conjunction with the following drawings in which.

DETAILED DESCRIPTION OF A PREFERRED EMBODIMENT

Figure 1A:
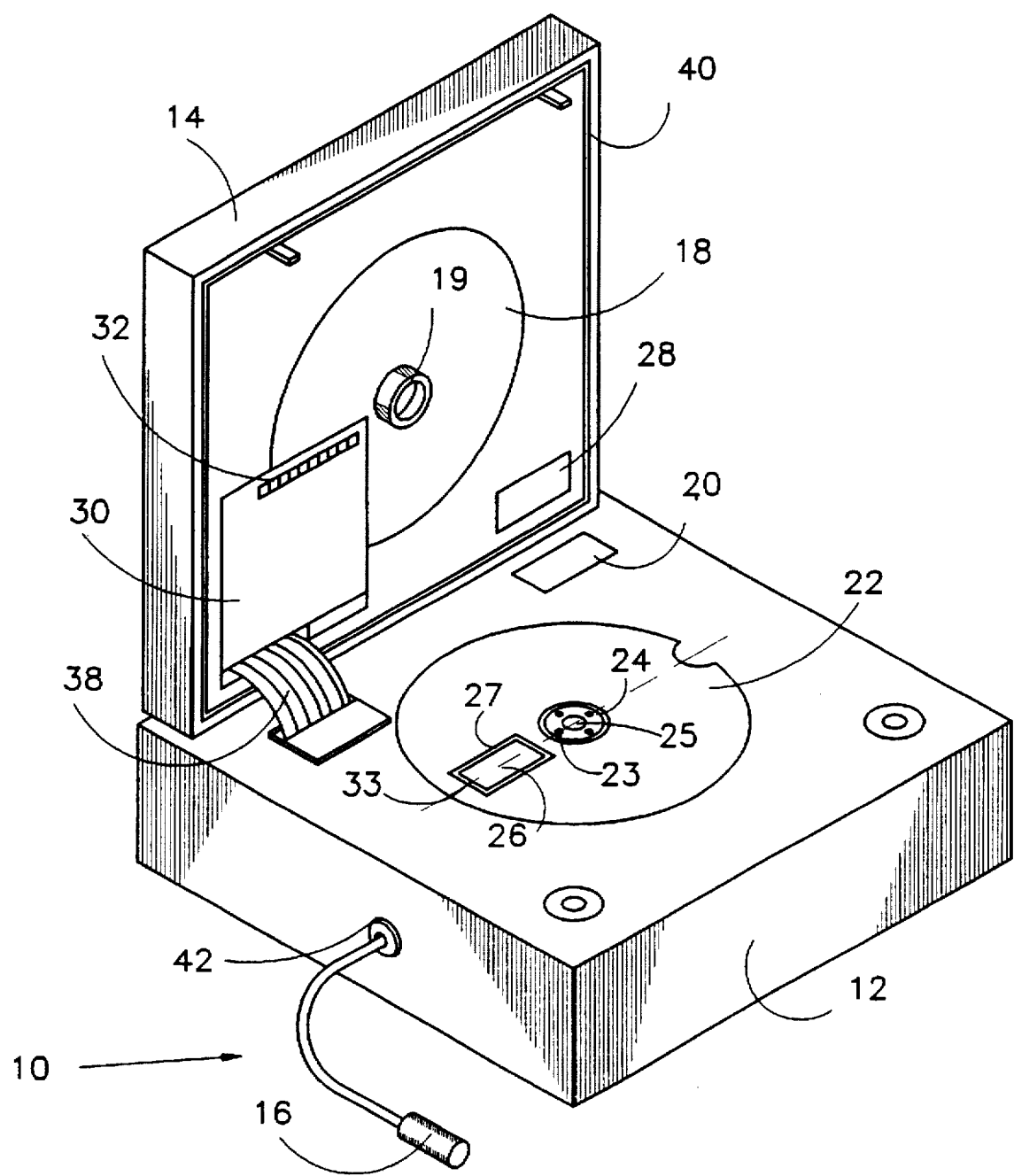
FIG. 1A is a pictorial illustration of an electrothermal recorder, constructed and operative in accordance with a preferred embodiment of the present invention, wherein a cover of the recorder is in an open position.
Figure 1B:
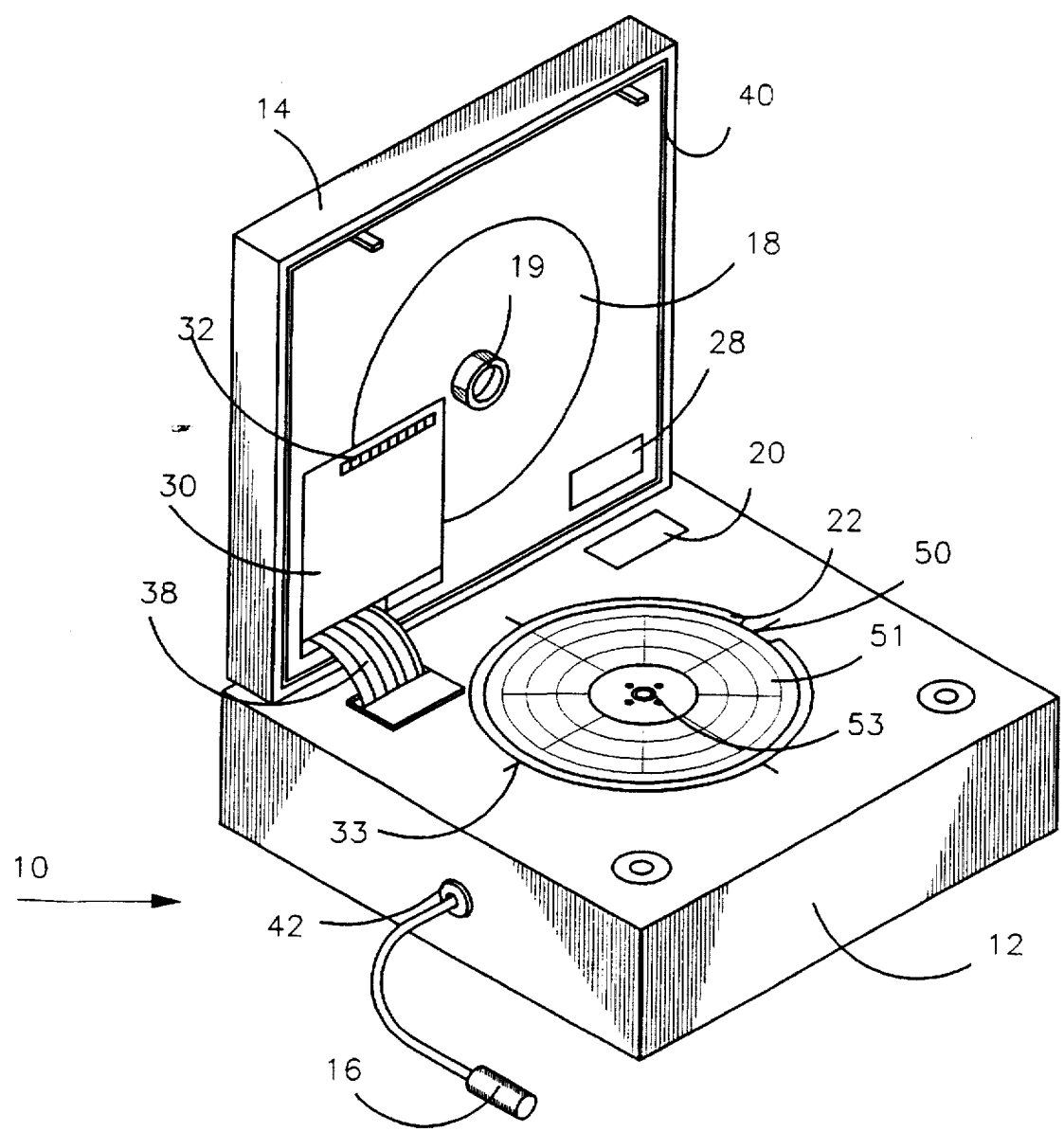
FIG. 1B is a pictorial illustration as in FIG. 1A and having thermosensitive recording material mounted therein.
Figure 3:
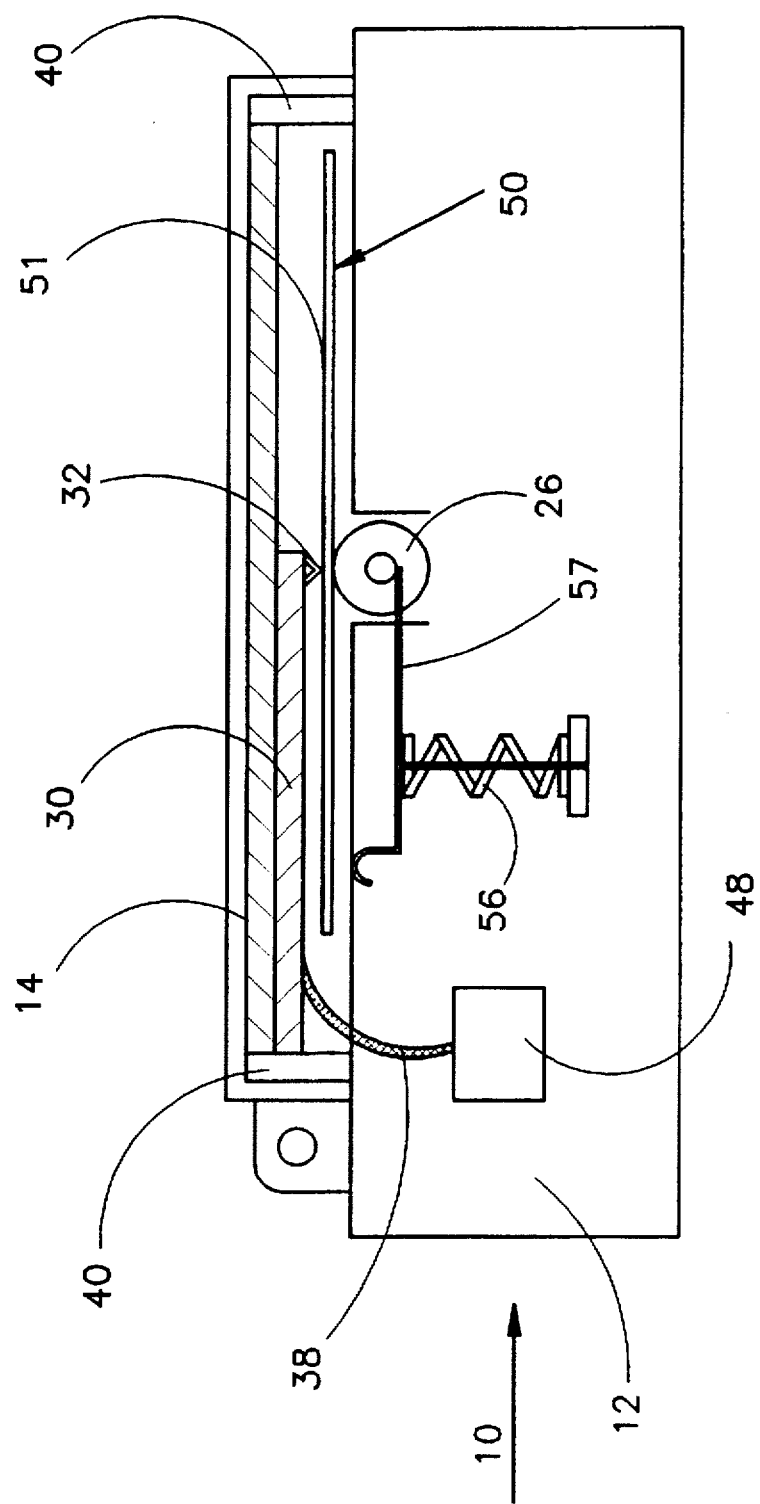
FIG. 3 is a cross-sectional, side view, illustration of the electrothermal recorder of FIGS. 1A and 1B, wherein the cover of the recorder is in a closed position.

Reference is now made to FIGS. 1A, 1B and 3 which illustrates an electrothermal recorder 10, constructed and operative in accordance with a preferred embodiment of the present invention. Recorder 10 includes a housing 12 and a cover 14, pivotably mounted on the top side of housing 12, which preferably includes a circumferential sealing member 40. In FIGS. 1A and 1B cover 14 is shown in an open position, while in the side view cross-section of FIG. 3 cover 14 is shown in a closed position. When cover 14 is closed, as in FIG. 3, the volume trapped between cover 14 and housing 12 is sealed from the external environment by virtue of sealing member 40.

A probe 16 is preferably connected to recorder 10 via a connector 42. Probe 16 is adapted to sense a preselected parameter, such as temperature, humidity, pressure, etc., within a preselected magnitude range. Probe 16 provides an output responsive to the magnitude of the sensed parameter.

As shown in FIG. 1A, the top side of housing 12 includes a circular region 22, preferably an indented region, for mounting thermosensitive recording material, as described below. A roller 26 is resiliently mounted in a slot 27, substantially along a radius of region 22, slightly protruding above region 22. Referring briefly to FIG. 3, it will be appreciated that resilient mounting of roller 26 in slot 27 is achieved by provision of a lever 57 and a spring 56. A shaft 24 is mounted at the center As shown in FIG. 1B, a disk-shaped card 50 having a thermosensitive upper surface 51 is securely mounted on a rotatable shaft 24 (FIG. 1A) located at the center of region 22. Shaft 24 is driven by a motor 54 (FIG. 4), preferably a step motor, mounted within housing 12. Recorder 10 is preferably also provided with a display 20 for displaying data relating to the parameter being recorded, as described below.

Cover 14 preferably includes a card window 18 for viewing surface 51 of card 50 when cover 14 is in a closed position, as in FIG. 3. Cover 14 preferably also includes a display window 28 for viewing display 20. A support member 19, which protrudes from window 18 will urge card 50 against shaft 24 when cover 14 is closed, is fixedly mounted at the center of window 18. A circular opening 53, having the appropriate dimensions for mounting around a protrusion 25 of shaft 24, is preferably formed at the center of card 50. Shaft 24 preferably includes a plurality of piercing pins 23, around protrusion 25, to provide piercing engagement between card 50 and shaft 24. When cover 14 is closed, card 50 is secured by pins 23 between support member 19 and shaft 24 and, thus, card 50 rotates together with shaft 24 when motor 54 is activated.

Figure 2:
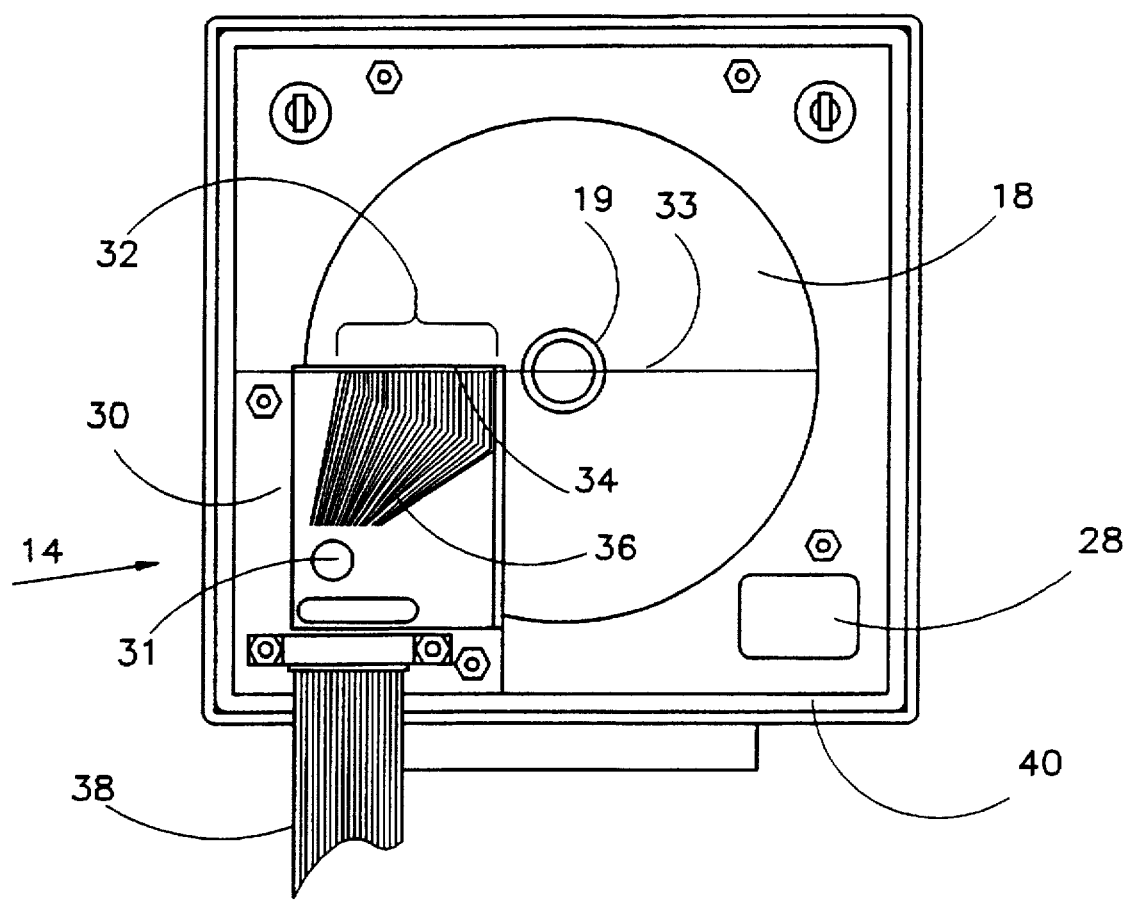
FIG. 2 is a bottom view illustration of the cover of the recorder in FIGS. 1A and 1B.

Reference is now made to FIG. 2 which illustrates a bottom view of cover 14. An electrothermal printhead 30, including an array 32 of electrothermal elements 34, is mounted on the bottom surface of cover 14. When cover 14 is closed, as shown in FIG. 3, printhead 30 engages thermosensitive surface 51 of card 50. Printhead 30 is preferably positioned such that array 32 engages card 50 along a recording axis 33 above roller 26 and parallel thereto. Thus, when cover 14 is closed, recording card 50 is urged by roller 26 against array 32 along recording axis 33.

As further shown in FIG. 2, printhead 30 includes a plurality of conductors 36, each conductor 36 being connected to a respective electrothermal element 34 in array 32. It should be appreciated that, in this arrangement, each element 34 of array 32 is separately addressable. Printhead 30 is preferably provided with a driver 31, associated with conductors 36, which selectively activates elements 34 of array 32 in accordance with command signals from a controller 48 (FIG. 3), as described below. The command signals are carried from controller 48 to driver 31 of printhead 30 via a flexible cable 38, which allows closing and opening of cover 14.

Figure 4:
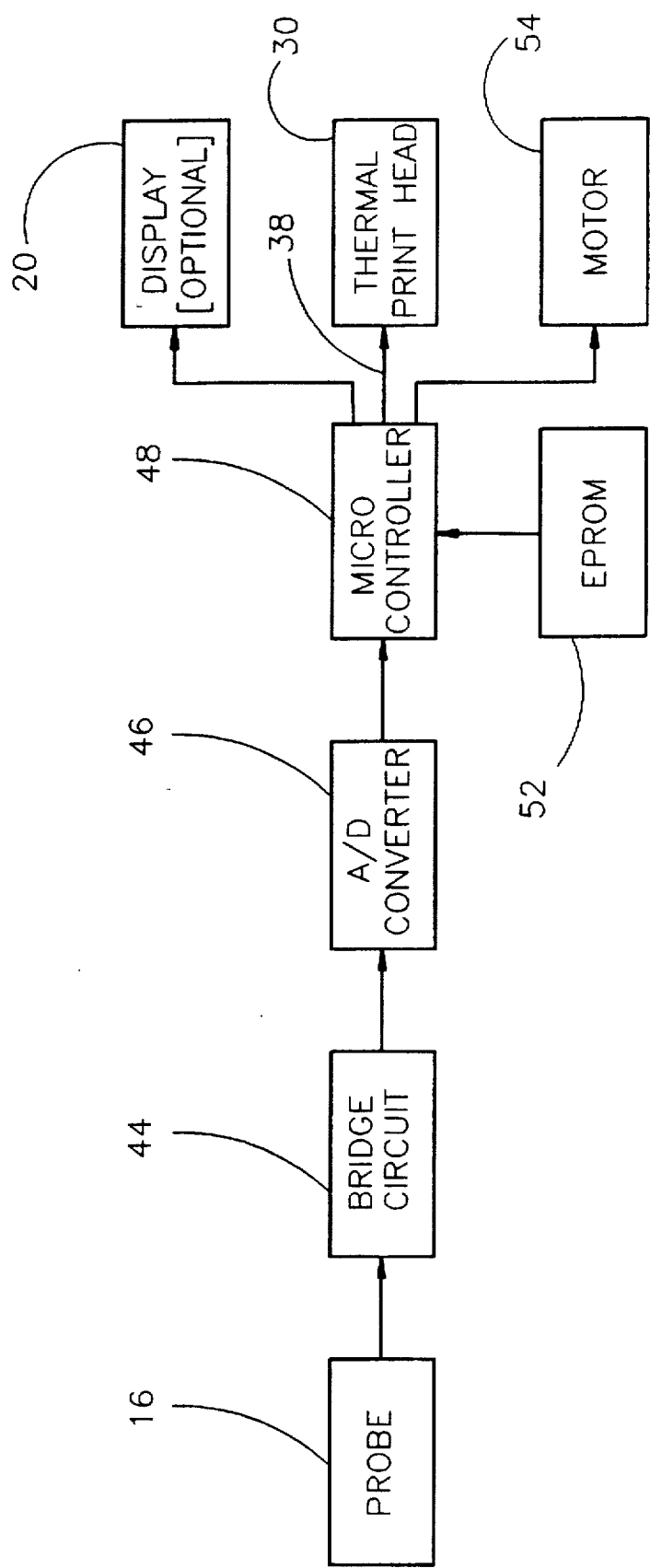
FIG. 4 is a simplified block diagram of circuitry useful for the operation of the electrothermal recorder of FIGS. 1–3.

Reference is now also made to FIG. 4, which schematically illustrates the internal circuitry of recorder 10. In a preferred embodiment of the present invention, as described above, probe 16 provides an output, typically an analog electric signal, responsive to the magnitude of the sensed parameter. The probe output is received, preferably via a bridge circuit 44, by an analog to digital (A/D) converter 46 which translates the probe output into a corresponding digital signal readable by controller 48, which preferably includes a microprocessor. Controller 48 is preferably associated with a read only memory 52, such as an EPROM, which provides controller 48 with suitable software. Memory 52 is preferably replaceable, thereby allowing adaptability of controller 48 for different applications of recorder 10. Controller 48 is preferably also associated with display 20, which displays readings corresponding to the output of probe 16 at preselected times and/or data relating to such readings.

In accordance with a preferred embodiment of the invention, controller 48 translates the converted probe output into the commands signals received by driver 31 of printhead 30, which selectively activates electrothermal elements 34 of array 32. For example, the preselected magnitude range sensed by probe 16 can be divided into a plurality of sub-ranges, each corresponding to a respective element 34 of array 32. According to this scheme, controller 48 activates a given element 34 only when the magnitude sensed by probe 16 is within the sub-range corresponding to the given element. If elements 34 are properly paired with the respective sub-ranges of magnitude, the location of an activated element 34 along axis 33, at any given time, substantially corresponds to the magnitude of the sensed parameter at the given time.

As mentioned above, recorder 10 preferably includes step motor 54 which drives shaft 24. In a preferred embodiment of the invention, the operation of motor 54 is controlled by a time-base circuit in controller 48. The rotation rate of motor 54, e.g. the number of "steps" per unit time for a step motor, is preferably constant and user-selectable, such that the rotation rate of recording card 50 can be selected according to specific application. For example, to record time dependence of temperature across a period of one month using one recording card 50, the time-base circuit should be adjusted to one revolution per month.

Referring particularly to FIG. 3., it should be appreciated that activation of array 32 by controller 48, while card 50 is urged against array 32, results in thermoprinting on surface 51 along recording axis 33. Since card 50 preferably rotates at a constant rate, which defines a time base, the image gradually evolving on surface 51 corresponds to a graph of the sensed parameter versus time.

It will be appreciated by persons skilled in the art that the present invention is not limited to what has been thus far described. Rather, the scope of the present invention is limited only by the following claims:

I claim:

1. An electrothermal recorder comprising:

a thermosensitive recording surface of a circular recording card which moves at a preselected, controlled, rate along a circular time axis;

an electrothermal print head having an array of separately activated electrothermal printing elements engaging said thermosensitive recording surface along a recording axis generally perpendicular to said time axis;

a probe for sensing a magnitude of a preselected parameter and generating an output responsive to the sensed magnitude;

a controller which generates command signals responsive to the output from said probe to said printhead for selectively activating the electrothermal elements of said printhead to thermoprint an indication of the sensed magnitude on said thermosensitive recording surface at a particular location on said time axis;

a housing having a site for mounting said recording card;

a cover pivotably mounted on said housing and adapted for covering said mounting site, when the cover is closed, and uncovering said mounting site, when the cover is open; and an environment sealing member mounted between said housing and said cover.

2. An electrothermal recorder comprising:

a thermosensitive recording surface of a circular recording card which moves at a preselected, controlled, rate along a circular time axis;

an electrothermal print head having an array of separately activated electrothermal printing elements engaging said thermosensitive recording surface along a recording axis generally perpendicular to said time axis;

a probe for sensing a magnitude of a preselected parameter and generating an output responsive to the sensed magnitude;

a controller which generates command signals responsive to the output from said probe to said printhead for selectively activating the electrothermal elements of said printhead to thermoprint an indication of the sensed magnitude on said recording surface at a particular location on said time axis;

a housing having a site for mounting said recording card; and a cover pivotably mounted on said housing and adapted for covering said mounting site, when the cover is closed, and uncovering said mounting site, when the cover is open; and wherein said printhead is mounted on the inner surface of said cover such that, when said cover is closed, said array of electrothermal elements engages the thermosensitive surface substantially along a radius of said recording card.

3. An electrothermal recorder comprising:

a thermosensitive recording surface of a circular recording card which moves at a preselected, controlled, rate along a circular time axis;

an electrothermal print head having an array of separately activated electrothermal printing elements engaging said thermosensitive recording surface along a recording axis generally perpendicular to said time axis said recording axis being parallel to a radius of said recording card;

a probe for sensing a magnitude of a preselected parameter and generating an output responsive to the sensed magnitude;

a controller which generates command signals responsive to the output from said probe to said printhead for selectively activating the electrothermal elements of said thermosensitive printhead to thermoprint an indication of the sensed magnitude on said recording surface at a particular location on said time axis;

a housing having a site for mounting said recording card;

a cover pivotably mounted on said housing and adapted for covering said mounting site, when the cover is closed, and uncovering said mounting site, when the cover is open; and an environment sealing member mounted between said housing and said cover wherein said printhead is mounted on the inner surface of said cover such that, when said cover is closed, said array of electrothermal elements engages the thermosensitive surface substantially along a radius of said recording card.

4. A recording device comprising:

a probe having an electric output signal responsive to a magnitude of a sensed preselected parameter;

a controller including an input coupled to said probe to receive said electric output signal responsive to said sensed magnitude;

a recording surface;

an electrothermal printhead having a plurality of electrothermal printing elements for thermoprinting on said recording surface, said electrothermal print head coupled to said controller, said controller having an output coupled to said printhead and generating an output signal in response to said electric output signal from said probe to activate at least one of said plurality of printing elements to thermoprint an indication of said sensed magnitude on said recording surface.

5. The recording device of claim 4 further comprising a housing, a cover pivotably mounted to said housing, and a sealing member mounted between said housing and said cover.

6. The temperature recording device of claim 5 wherein said printhead is mounted to said cover.

7. The temperature recording device of claim 4 wherein said recording surface comprises a circular recording card.

8. The temperature recording device of claim 7 wherein said circular recording card includes a circular time axis.

9. The recording device of claim 8 further comprising a motor mounted in said housing for rotating said circular recording card at a preselected rate.

10. The recording device of claim 4 wherein said preselected parameter is temperature.

11. The recording device of claim 4 wherein said preselected parameter is humidity.

12. The recording device of claim 4 wherein said preselected parameter is pressure.

* * * * *